United States Patent Office 3,219,468
Patented Nov. 23, 1965

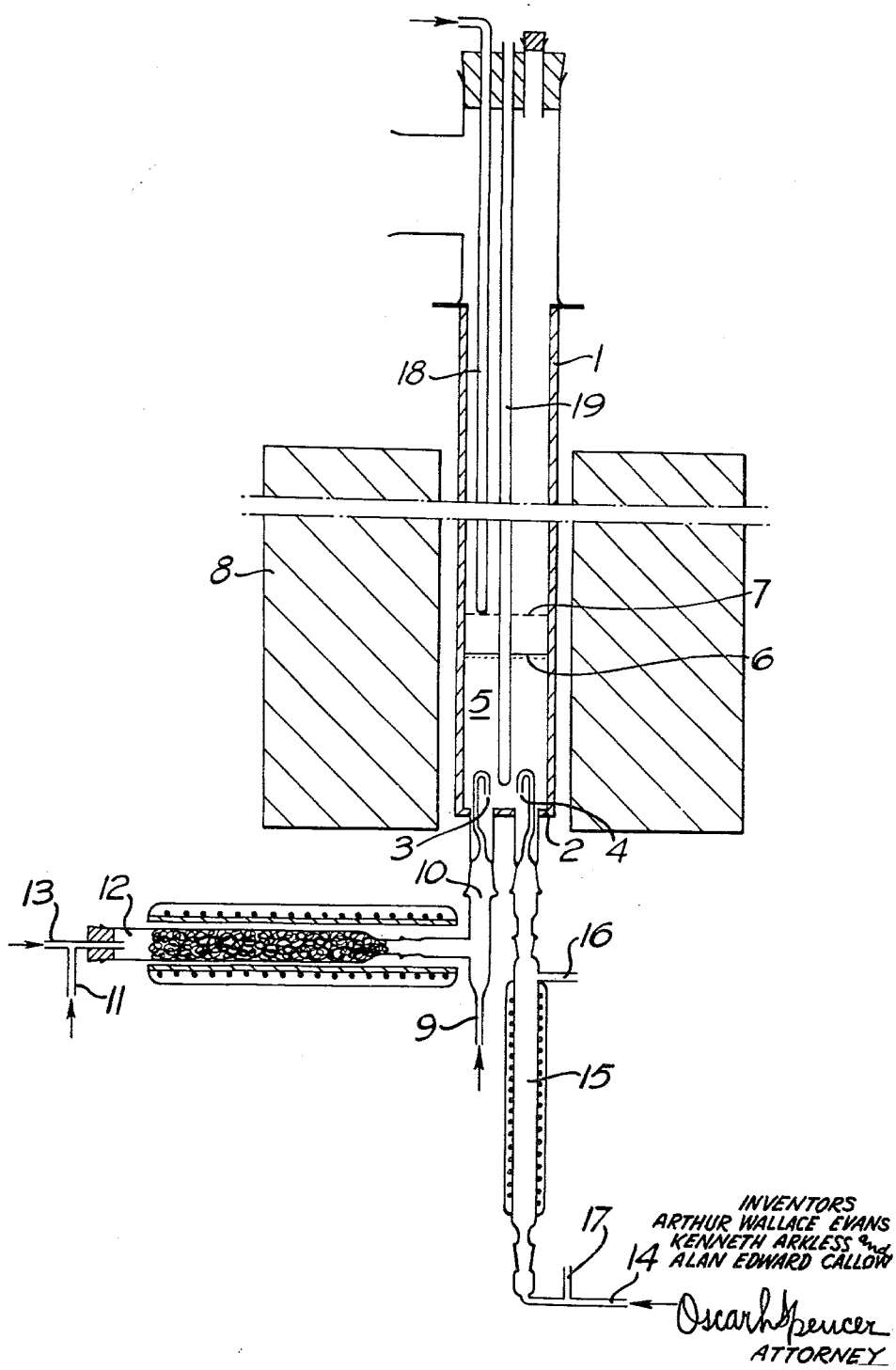

3,219,468
PRODUCTION OF SOFT BEDS IN VAPOUR PHASE OXIDATION OF TITANIUM TETRAHALIDES
Arthur Wallace Evans, Nunthorpe, Kenneth Arkless, Stockton-on-Tees, and Alan Edward Callow, Normanby, England, assignors to British Titan Products Company Limited, Billingham, Durham, England, a corporation of the United Kingdom
Filed July 24, 1961, Ser. No. 126,310
Claims priority, application Great Britain, July 27, 1960, 26,192/60
13 Claims. (Cl. 106—300)

The invention relates to the vapour phase oxidation of titanium tetrahalide by the dynamic bed process.

Methods have been proposed in the past for the vapour phase oxidation of titanium tetrachloride to produce pigmentary titanium dioxide. Some of the early empty chamber processes include the addition of various substances, such as silicon compounds and aluminium compounds, to the reactants in order to improve the pigmentary properties of the final product. For example, aluminium chloride has been mixed with the titanium tetrachloride introduced to increase the proportion of rutile in the final product, and silicon tetrachloride has been mixed with the titanium tetrachloride introduced to increase the proportion of anatase in the final product or to diminish the size of the latter's particles.

More recently, a fluidised bed technique has been suggested for the production of titanium dioxide wherein oxygen and titanium tetrachloride are introduced into a hot fluidised bed of inert particles and titanium dioxide is entrained out of the bed by the effluent gases. In this fluid bed technique, it has been suggested to mix aluminium chloride or silicon tetrachloride with the titanium tetrachloride prior to introduction in order to modify the product.

This fluide bed technique, however, has one grave disadvantage which has seriously hindered its economic use. This is that a substantial part (of the order of 20% to 40%) of the titanium dioxide produced is not carried away by the effluent gases, but remains in the fluidised bed where it forms accretions on the surface of the particulate substrate material constituting the fluidised bed. The titanium dioxide in these accretions adheres so strongly to the particles of substrate material that it forms an accretion which resembles a hard cement. Even after severe abrasion or attrition these accretions are broken down only to a very small extent. Moreover, the small proportion of the adhering titanium dioxide which can be separated from the particles of substrate material by such abrasion or attrition is unfitted for use as a pigment, since it has a gritty character and poor hiding power or tinting strength. That small proportion of the accretion which can be separated has to find more limited use in vitreous enamels, or less desirably it can be rechlorinated to produce titanium tetrachloride which is recycled to the fluidised bed chamber to be reoxidised. This accretion problem has up to now been so uneconomic a factor that it has severely limited the commercial desirability of the fluid bed process.

Up to now, no practical means have been suggested for avoiding this handcap due to accretions and for recovering substantially all the titanium dioxide product in a form suitable for use as a pigment; particularly, no means have ben suggested for recovering substantially all the titanium dioxide product with a very high rutile content (rutile being the most widely used pigmentary form) and other desirable characteristics for a good pigment.

There is herein provided a method for overcoming the above described disadvantages of the fluidised bed process and for recovering substantially all the titanium dioxide product of the reaction having a very high pigmentary rutile content. The present invention does not prevent the formation of the accretions described above, but rather ensures that the accretions are made up of particles which are loosely held together and which can be removed from the substrate and separated as generally rutile particles by a simple process of attrition, so that substantially all the titanium dioxide in the accretions can be recovered in fine, pigmentary rutile form. On the other hand, the inert particles coated with loosely held pigmentary titanium dioxide may be employed as such in the manufacture of paints.

According to the present invention, in a process of vapour phase oxidation of titanium tetrahalide in a dynamic bed of inert particulate matter, a small quantity of aluminium halide is introduced into the bed, separately from the titanium tetrahalide, and a small quantity of silicon halide is introduced into the bed separately from the aluminium halide. The terms "aluminium halide" and "silicon halide" as used herein are to be construed as excluding the fluorides. Usable halides include aluminium chloride ($AlCl_3$), aluminum bromide ($AlBr_3$), aluminium iodide ($AlI_3$) silicon tetrachloride ($SiCl_4$), silicon tetrabromide ($SiBr_4$) and silicon tetraiodide ($SiI_4$).

It is preferred that the aluminum halide be introduced in admixture with oxygen-containing gas. If this be done, it is preferred that the oxygen-containing gas be in excess of the amount required to oxidise the aluminum halide, and suitably at least five times this latter amount. The amount of oxygen-containing gas introduced with the aluminium halide may be a relatively small part of the total amount of oxygen-containing gas introduced into the bed, or it may be a relatively large part of such total amount. Indeed, the aluminium halide may be introduced in admixture with all the oxygen-containing gas used in the reaction. The mixed feed of aluminium halide and oxygen-containing gas will normally be introduced into the reactor in the vapour phase at a temperature below that at which substantial reaction between them takes place, e.g. below 400° C. The aluminum halide whether introduced alone or not, is preferably introduced into the base of the fluid bed, suitably up through the base of the reactor.

Any oxygen-containing gas not introduced with the aluminium halide may be introduced in some other manner, for example alone or with the titanium tetrahalide. It is preferred, however, that substantially no oxygen-containing gas be introduced with the silicon halide.

It can be advantageous to introduce the silicon halide separately from the titanium tetrahalide, as well as separately from the oxygen-containing gas and the aluminum halide, as it has been discovered that this ensures an even greater rutile content in the titanium dioxide produced. Even better results in respect of rutile content can be obtained by introducing the silicon halide at a point not only separate from but actually remote from the points of introduction of the titanium tetrahalide, the oxygen-containing gas and the aluminum halide. The silicon halide may be introduced at the base of the bed, or at various points within the bed, or even at or near the surface of the bed and preferably just above the surface of the bed. It may be injected with a carrier gas, such as chlorine.

The preferred halides are titanium tetrachloride, aluminum trichloride and silicon tetrachloride. The amount of aluminum and silicon halides introduced will preferably be such that the weights of each of the alumina and silica in the final titanium dioxide pigment will be from 0.1% to 7% (more preferably 0.25% to 5%) of the weight of such pigment. It will however generally be found desirable that the alumina and silica introduced will together be no more than 10% of the final pigment. The relative proportions of aluminum and silicon halides introduced will normally be such as to produce a weight ratio of alumina to silica in the final pigment of between 20:1 and 1:5 preferably 12:1 and 3:1.

The process is normally carried out at a bed temperature between 900 and 1200° C., preferably between 950 and 1100° C. Keeping within these ranges of temperature, especially the latter, is of further assistance in obtaining a high tinting strength and high rutile content in the pigment material entrained in the effluent gases.

The oxidation process may, if desired, be carried out in the presence of a small proportion of moisture (e.g. less than 2% by weight of titanium tetrahalide), which also encourages the formation of rutile rather than anatase.

In the course of the process most of the titanium dioxide produced (60% to 80%) will be entrained in mainly rutile form in the effluent gases and carried away from the reaction chamber. The remainder will form loosely-bound accretions of generally rutile particles on the substrate material constituting the fluidised bed. The bed will, therefore, increase in volume, and the excess may be removed at intervals or removed continuously such as by an overflow. The excess material so removed from the bed may be subjected to a method of attrition which will remove the loosely-bound particles from the substrate and separate them from one another. The substrate particles will be much coarser than the titanium dioxide particles produced thereon, and so either gas or liquid separation will permit easy classification and allow the substrate material to be recovered and returned to the reaction vessel containing the fluidised bed. The fine pigmentary rutile titanium dioxide removed in the process of attrition will be collected and, if necessary, suitably dressed for sale as a pigment.

Among the methods of attrition which may be used for the purpose described in the last paragraph are many forms of milling conducted by wet or dry processes. It is preferred to use wet processes, as in that case the pigmentary material recovered by attrition may be passed immediately to hydro-separation plant and then exposed to a wet coating process, before being dried and dressed for use as a pigment.

It may be advantageous to use mills wherein the agitator is made, at least on the surface, of polyurethane rubber and revolves in a vessel which may itself be lined with polyurethane rubber; such a system is described in our specification No. 15,407/60. Another wet milling process is that using the usual ball mills, preferably those made of stone or ceramic ware which will not be unduly abraded and will therefore not introduce a discolouring impurity into the final pigment.

The actual milling medium may vary in size between wide limits: e.g. there may be used spheres of 3" diameter for ball mills or, for sand mills, fine sand of particle diameter 76 to 300$\mu$. Thus, the construction of the mills may vary considerably: e.g. they may employ a simple revolving cylinder on a horizontal axis, or a method whereby sand is mechanically impelled by an agitator or by a vessel rotating on a vertical axis. Many variants on these methods will be obvious to one skilled in the art.

Dry mills may also be used (although they are not preferred); they may be of similar construction to the wet mills except that no liquid is present.

Other suitable mills are those of the fluid energy type sometimes referred to as jet mills.

After the above milling step, the particle bed material may be ground and classified or simply classified in accordance with the techniques set forth in the copending Groves and Evans application Serial No. 816,058 filed 27th May, 1959. The classified bed particles may be returned to the fluid bed reaction.

The operation of the invention is illustrated in the accompanying drawing which is a diagrammatic sketch of a heated fluid bed reactor on a laboratory scale. This laboratory scale apparatus is merely a convenience to illustrate the invention, but in commercial operation a large scale apparatus would be used, preferably operated in an autothermal manner, i.e. maintaining the required heat of the bed by the exothermic heat of reaction without the necessity of applying outside heat such as described in our copending application No. 6,988/58.

In the drawing, a 3" internal diameter fused silica tube 1, of 48" length, is sealed at the base with a fused silica disc 2 through which pass two dip-pipe inlets 3 and 4. A bed 5 of inert particles (not shown) is contained at the bottom of the tube 1 and has a static depth of 6". The bed 5 has a surface 6 when static and a general surface 7 when fluidised. Surrounding the tube 1 is a furnace 8.

The inlet 3 is designed to introduce a mixture of aluminum trichloride (as the preferred aluminum halide) and oxygen. The oxygen is supplied to the inlet 3 from a pipe 9 leading into a mixing tube 10. The aluminum trichloride is provided by passing chlorine from a pipe 11 through a heated reactor tube 12 containing aluminum turnings and leading the aluminum trichloride thus produced to the mixing tube 10. A pipe 13 is provided in order to introduce a nitrogen purge if and when desired.

The inlet 4 is designed to introduce titanium tetrachloride (as the prferred titanium halide), whic may if desired be in admixture with silicon tetrachloride (as the preferred silicon halide). This single or mixed feed is introduced as a liquid from pipe 14, through a heated vaporiser 15 and hence to the inlet 4. Pipes 16 and 17 are provided in order to introduce a nitrogen purge if and when desired.

As an optional feed means for the silicon tetrachloride a dip-pipe 18 is introduced through the top of the tube 1 and depends down to a point just above the general surface 7 of the fluidised bed.

A thermocouple in a sheath 19 is also introduced through the top of the tube 1, and depends down into the bed 5.

The examples which will now be described in order to illustrate the invention were carried out by means of the heated fluid bed reactor hereinbefore described.

The bed was of dense titanium dioxide particles (−44+72 British Standard sieve) having a hard titanium dioxide accretion derived from previous use in a fluid bed operated in accordance with aforementioned prior art processes. This was a matter of convenience and particles without such accretions could have been used. The bed was initially fluidised with air until external heating by means of the furnace 8 had raised the temperature of the bed to the required degree. The air was then replaced by oxygen and titanium tetrachloride vapour admitted through the separate dip-pipe inlets 3 and 4 respectively. The oxygen was metered at 18 litres per minute (normal temperature and pressure, i.e. 760 mm. Hg and 20° C.); the titanium tetrachloride was metered at 54 cc. liquid per minute before being vaporised by the heated vaporiser 15.

*Example 1*

The temperature of the bed during the reaction was 1100° C. The oxygent entering the reactor through the dip-pipe inlet 3 contained aluminium trichloride vapour generated by passing chlorine gas at 1 litre per minute (N.T.P.) over the aluminum turnings in the reactor tube 12. A stream of titanium tetrachloride preheated to 200° C. entered the reactor through the dip-pipe inlet 4, the titanium tetrachloride stream contained 1.5 g. silicon tetrachloride per 100 g. titanium tetrachloride.

The titanium dioxide pigment entrained in the effluent gases from the fludised bed was separated in an external settling vessel. On examination it was found to possess excellent pigmentary properties, having excellent colour with a tinting strength of 1600 on the Reynolds scale and a rutile content of 96.7% by weight.

After the fluidised bed reactor had been in operation for 30 minutes, the bed material was removed from it. It was found that 39.7% by weight of the titanium tetrachloride admitted into the fluid bed reactor had been retained on the bed as titanium dioxide. The bed material was submitted to wet ball milling in a simple apparatus for 15 minutes. This lowered the proportion of admitted titanium tetrachloride, retained on the bed as titanium dioxide, to 27%. On extending the milling time for a further 3¾ hours, this proportion was reduced to zero. The titanium dioxide removed from the bed material by this milling process had good pigmentary properties, having a good colour and a tinting strength of 1200 on the Reynolds scale, and a rutile content of 97.3% by weight.

*Example 2*

The experiment was repeated in the manner described in Example 1 except that the temperature of the fluid bed during the reaction was 1050° C., and the amount of silicon tetrachloride introduced was reduced to 0.3 g. per 100 g. titanium tetrachloride.

The titanium dioxide recovered from the effluent gases possessed excellent pigmentary properties, having a good colour with a tinting strength of 1520 on the Reynolds scale, with a rutile content of 99.1%.

The bed material removed from the fluid bed reactor after it had been operated for 30 minutes was found to have retained 38.1% of the admitted titanium tetrachloride as titanium dioxide. After being subjected to wet ball milling for 4 hours, the bed material no longer contained any of the accreted titanium dioxide. The titanium dioxide thus separated from the bed material had good pigmentary properties, having a good colour with a tinting strength of 1110 on the Reynolds scale and a rutile content of 98%.

*Example 3*

The experiment was repeated in the manner described in Example 1, except that the temperature of the fluid bed during the reaction was 1050° C., and the silicon tetrachloride was not introduced with the titanium tetrachloride through the dip-pipe inlet 4, but was injected with chlorine gas at the surface of the fluidised bed through the dip-pipe 18. This injection was effected by passing chlorine through liquid silicon tetrachloride at room temperature; the resulting mixture of chlorine and silicon tetrachloride was then injected through the dip-pipe 18. The amount of silicon tetrachloride injected was 1.5 g. per minute, and the amount of chlorine gas was 3.0 litres per minute (N.T.P.).

The titanium dioxide recovered from the effluent gases had excellent pigmentary properties, having a good colour with a tinting strength of 1530 on the Reynolds scale and a rutile content of 97.6% by weight.

The bed material removed from the fluid bed reactor after it had been in operation for 30 minutes was found to have retained 37.1% of the admitted titanium tetrachloride as titanium dioxide. On wet ball milling the bed material for 15 minutes the proportion of titanium tetrachloride retained on it as the dioxide was lowered to 21.2%. On extending the milling time by a further 3¾ hours this proportion was reduced to zero. The titanium dioxide removed from the bed material by this milling process had a tinting strength of 1240 on the Reynolds scale and a rutile content of 95.3% by weight.

*Example 4*

The experiment was repeated in the manner described in Example 1, except that the temperature of the fluid bed during the reaction was 1050° C., and the aluminium trichloride gas entering the reactor with the oxygen through the dip-pipe inlet 3 was generated by passing chlorine gas at 1.4 litres per minute (N.T.P.) over the aluminium turnings in the reactor tube 12.

The titanium dioxide recovered from the effluent gases had excellent pigmentary properties, having excellent colour with a tinting strength of 1520 on the Reynolds scale and a rutile content of 93.8% by weight.

The bed material was removed from the fluid bed reactor after it had been operated for 30 minutes and was found to have retained 36% of the admitted titanium tetrachloride as titanium dioxide. After being subjected to wet ball milling for 4 hours, the bed material no longer contained any of the accreted titanium dioxide. The titanium dioxide thus separated from the bed material had good pigmentary properties, having a good colour with a tinting strength of 1230 on the Reynolds scale and a rutile content of 96.8% by weight.

*Example 5*

The experiment was repeated in the manner described in Example 1, except that the temperature of the fluid bed during the reaction was 1050° C., and no silicon halide was introduced into the fluid bed reactor. Thus the operation was not in accordance with the invention.

The titanium dioxide recovered from the effluent gases possessed good pigmentary properties, having a good colour with a tinting strength of 1430 on the Reynolds scale and a rutile content of 97.7% by weight.

The bed material removed from the fluid bed reactor after it had been in operation for 30 minutes was found to have retained 38.5% by weight of the admitted titanium tetrachloride as dense rock-like accretions of titanium dioxide. On wet ball milling the bed material for 15 minutes the proportion of titanium tetrachloride retained on it as titanium dioxide was 36.7%. On extending the milling time for a further 15¾ hours this proportion had been lowered only to 29%.

The titanium dioxide separated from the bed material by this process of milling had very poor pigmentary properties; it was very gritty with a tinting strength of less than 500 on the Reynolds scale.

*Example 6*

The experiment was repeated in the manner described in Example 1, except that the temperature of the fluid bed during the reaction was 1050° C., and no aluminium chloride was introduced into the fluid bed reactor. Thus the operation was not in accordance with the invention.

The titanium dioxide recovered from the effluent gases had a tinting strength of 1050 on the Reynolds scale and a rutile content of only 19% by weight.

The bed material removed from the fluid bed reactor after it had been in operation for 30 minutes was found to have retained 33.4% of the admitted titanium tetrachloride as hard accretations of titanium dioxide. On wet ball milling the bed material for 4 hours the proportion of titanium tetrachloride retained on it as titanium dioxide was reduced, only to 27.9%. The tinting strength was poor and the product gritty.

*Example 7*

The process described in Example 2 was repeated up to the removal of the bed material from the reactor.

The titanium dioxide recovered from the effluent gases which left the bed possessed excellent pigmentary properties, had a good colour with a tinting strength of 1680 on the Reynolds scale and a rutile content of 98.2%.

The material recovered from the fluid bed was found to have retained 38.5% of the titanium tetrachloride admitted to the reactor as titanium dioxide. This material was milled as an aqueous slurry using an impeller immersed in the slurry and driven at a high speed for 30 minutes. The bed material, after milling, was found to have no titanium dioxide accretion on the surface of the particles.

The titanium dioxide separated from the bed particles had good pigmentary properties, having a good colour and a tinting strength of 1480 on the Reynolds scale. The rutile content was 97.5%.

*Example 8*

The experiment was carried out at 1050° C. using the same quantity of $AlCl_3$ and $SiCl_4$ as in Example 1 but the $AlCl_3$ vapour was injected with the $TiCl_4$ vapour and the $SiCl_4$ was carried in with part of the $O_2$ stream. Thus the operation was not in accordance with the invention.

The $TiO_2$ recovered from the effluent gases possessed poor pigmentary properties, having a tinting strength of 600 on the Reynolds scale and a rutile content of only 50%. It was not suitable for use in normal pigment applications. Moreover, the bed particles were not as readily millable after this experiment as the bed particles after the process described in Examples 1–7.

*Example 9*

Example 8 was repeated but both $AlCl_3$ vapour and $SiCl_4$ vapour were added in the $O_2$ stream. Thus the operation was not in accordance with the invention.

The $TiO_2$ recovered from the effluent gases was of very poor quality, having a tinting strength of only 700 on the Reynolds scale and a rutile content of 61%. It was not suitable for use in normal pigment applications. Moreover, the bed particles were not as readily millable after this experiment as the bed particles after the process described in Examples 1–7.

*Example 10*

Example 8 was repeated but both $AlCl_3$ vapour and $SiCl_4$ were added to the $TiCl_4$ feed. Thus the operation was not in accordance with the invention.

The $TiO_2$ recovered from the effluent gases was unsuitable for use in normal pigment applications having a tinting strength of 950 on the Reynolds scale and a rutile content of only 53%. Moreover, the bed particles were not as readily millable after this experiment as the bed particles after the process described in Examples 1–7.

Finally, it should be stressed that the titanium dioxide pigmentary material produced according to the invention of course contains substances other than titanium dioxide, e.g. silica and alumina. The rutile contents given hereinabove are calculated as percentages of the actual titanium dioxide rather than of the pigmentary material as a whole.

The size of the inert particles comprising the bed material range from 40 to 1000 microns in size. The bed material may be silica, zircon, alumina and/or titanium dioxide (particularly rutile).

When these inert bed particles are coated with loosely held or lightly cemented titanium dioxide as described hereinabove, a pellet is formed which has a size of about 200 to 2000 microns. The lightly cemented titanium dioxide held on the surface has a particle size ranging from 0.05 to 0.6 micron, preferably from 0.15 to 0.3 micron.

These pellets may be employed directly in paint as a pigment. Thus, they may be milled with a commercial alkyd resin, such as a linseed oil modified pentaerythritolphthalic acid polyester, in a porcelain lined pebble mill containing porcelain balls. Usually less than the conventional number of balls are necessary due to the increased volume resulting from the addition of the pellets. The paint solvent (for example, mineral spirits) may be first milled with the pigment so as to separate the pigmentary $TiO_2$ from the inert substrate and the resin may then be added. The resulting paint can be filtered through a screen or cloth bag filter to remove any large undesirable particles. The pellets of this invention are most attractive for employment in outside house and masonry paints. In addition, these pellets may be used for pigmenting plastics, especially those employed for abrasive purposes.

Of the pellets formed from coating the above-mentioned substrates, those wherein the substrate is hard titanium dioxide or silicon dioxide are preferable. Of these, titanium dioxide substrates are most preferred due to their greater hiding power, but silicon dioxide is extremely satisfactory if an extender is desired.

Although the present invention has been described with reference to specific details of certain embodiments thereof, it is not intended that such details shall be regarded as limitations except insofar as such limitations are included in the following claims.

What is claimed is:

1. In the vapour phase oxidation of a titanium tetrahalide by the reaction of said halide with oxygen in a dynamic bed to produce pigmentary $TiO_2$, the improvement which comprises adding to the bed aluminum halide and silicon halide separate from each other during the oxidation reaction.

2. The process of claim 1, wherein the silicon halide is added to the bed in admixture with the titanium tetrahalide.

3. The process of claim 1, wherein the silicon halide is introduced separately from the oxygen, the titanium tetrahalide and aluminium halide.

4. The process of claim 3, wherein the silicon halide is introduced to the top level of the bed.

5. The process of claim 1, wherein the total amount of aluminium halide and silicon halide introduced comprises, on the average, not more than 10 percent by weight as alumina and silica of the $TiO_2$ product produced.

6. The process of claim 5, wherein the weight ratio of introduced aluminium halide to introduced silicon halide determined as the weight ratio of alumina to silica in the resulting $TiO_2$ product, is between 20:1 and 1:5.

7. The process of claim 6, wherein the weight ratio is between 12:1 and 3:1.

8. In the vapour phase oxidation method of producing pigmentary titanium dioxide by contacting vaporous titanium tetrachloride with an oxygen containing gas in a fluidised bed of inert particles, the improvement which comprises introducing aluminium halide and silicon halide to the bed separately from each other during the oxidation reaction.

9. The process of claim 8, wherein the aluminum halide is aluminium chloride and is added in admixture with the oxygen containing gas.

10. The process of claim 9, wherein the silicon halide is silicon tetrachloride.

11. In the continuous method for effecting vapour phase oxidation of a titanium tetrahalide to produce pigmentary $TiO_2$ by reacting vaporous titanium tetrahalide with gaseous oxygen in a dynamic bed of inert particles maintained in a chamber, the improvement which comprises continuously adding aluminium halide and silicon halide separately from each other to the reaction, intermittently withdrawing a part of said bed from the chamber, milling said part to remove pigmentary titanium dioxide.

12. The method of claim 11, wherein said part after milling and removal of pigmentary titanium dioxide, is classified according to particle size and a portion thereof is returned to the bed.

13. A method for the manufacture of titanium dioxide pigment which comprises the steps of establishing a dynamic bed of inert particles in a chamber wherein said bed is heated to a temperature of about 800° to about 1200° C., introducing separately rising streams of free oxygen containing gaseous materials and titanium tetrachloride vapour at the bottom of said chamber to maintain said bed in dynamic condition, said separate stream of free oxygen containing gaseous material containing therein vaporous aluminium chloride and said stream of $TiCl_4$ vapour containing therein silicon tetrachloride, the amount of $AlCl_3$ and $SiCl_4$ separately introduced is from 0.1 to 7 percent, determined as alumina and silica in the pigment produced of the weight of the titanium dioxide pigment produced, the combined weight of alumina and silica, on the average, not exceeding 10 percent of the weight of said pigment, said weight ratio of alumina to silica in said pigment is between 20:1 and 1:5; withdrawing from the chamber pigmentary titanium dioxide in a gaseous stream; intermittently withdrawing a part of said bed from the bed and milling said part to remove adhering pigmentary titanium dioxide.

References Cited by the Examiner

UNITED STATES PATENTS

| | | | |
|---|---|---|---|
| 2,760,846 | 8/1956 | Richmond et al. | 106—300 |
| 2,790,704 | 4/1957 | Lewis | 106—300 |
| 2,964,386 | 12/1960 | Evans et al. | 23—202 |

FOREIGN PATENTS 245,131   12/1959   Australia.

TOBIAS E. LEVOW, *Primary Examiner.*

JOHN H. MACK, *Examiner.*